United States Patent [19]
Dimitri

[11] Patent Number: 6,091,860
[45] Date of Patent: Jul. 18, 2000

[54] SYSTEM AND METHOD FOR PROCESSING PIXELS FOR DISPLAYING AND STORING

[75] Inventor: Thomas J. Dimitri, Phoenix, Ariz.

[73] Assignee: PageMasters, Inc., Phoenix, Ariz.

[21] Appl. No.: 08/969,213

[22] Filed: Nov. 12, 1997

[51] Int. Cl.$^7$ ................................................ G06K 9/32
[52] U.S. Cl. .......................................... 382/299; 382/232
[58] Field of Search ................................... 382/299, 312, 382/232, 245, 246, 240

[56] References Cited

U.S. PATENT DOCUMENTS

| | | | |
|---|---|---|---|
| 4,614,977 | 9/1986 | Kawahara et al. | 382/47 |
| 4,829,587 | 5/1989 | Glazer et al. | 358/260 |
| 4,873,515 | 10/1989 | Dickson et al. | 340/728 |
| 4,905,166 | 2/1990 | Schuerman | 364/518 |
| 5,115,325 | 5/1992 | Kallin et al. | 358/406 |
| 5,185,852 | 2/1993 | Mayer | 395/109 |
| 5,220,650 | 6/1993 | Barkans | 395/163 |
| 5,226,094 | 7/1993 | Eschbach | 382/41 |
| 5,270,836 | 12/1993 | Kang | 358/459 |
| 5,276,790 | 1/1994 | Lo et al. | 395/142 |
| 5,301,037 | 4/1994 | Kang et al. | 358/451 |
| 5,333,250 | 7/1994 | Staley, II et al. | 395/143 |
| 5,363,213 | 11/1994 | Coward et al. | 358/455 |
| 5,452,412 | 9/1995 | Johnson, Jr. et al. | 395/143 |
| 5,519,823 | 5/1996 | Barkans | 395/143 |
| 5,548,689 | 8/1996 | Poppenga et al. | 395/109 |
| 5,553,171 | 9/1996 | Lin et al. | 382/299 |
| 5,555,360 | 9/1996 | Kumazaki et al. | 395/143 |
| 5,579,412 | 11/1996 | Ando | 382/299 |
| 5,704,019 | 12/1997 | Akiyama et al. | 382/298 |
| 5,708,518 | 1/1998 | Parker et al. | 358/534 |

FOREIGN PATENT DOCUMENTS 0 206 401 A1  12/1986  European Pat. Off. .
0 220 568 A2  6/1987  European Pat. Off. .

OTHER PUBLICATIONS

Ping Wah Wong, *Adaptive Error Diffusion and Its Application in Multiresolution Rendering*, IEEE Transactions on Image Processing, vol. 5, No. 7, Jul. 1996, pp. 1184–1197.

James D. Foley 2nd ed in *C, Computer Graphics Principles and Practice*, Addison–Wesley Publishing Company, 1996, pp. 642, 643, 816–823, 908, 909.

Patricia Termain Eliason, *Integration of geologic, Geochemical, and geophysical data of the Cement oil field, Oklahoma, using spatial array processing*, Geophysics, vol. 48, No. 10, Oct. 1983, pp. 1305–17.

*Primary Examiner*—Yon J. Couso
*Attorney, Agent, or Firm*—William R. Bachand; Squire, Sanders & Dempsey L.L.P.

[57] ABSTRACT

When receiving input scan lines from a conventional scanner, a system of the present invention simultaneously provides a sequence of pixels for display and a second sequence of pixels for storage, for example on a hard disk. A pixel for display has an intensity resolution greater than a pixel of the input scan line. The intensities of scan line pixels in a 16 by 16 matrix are accumulated for incrementally revising the intensity of the pixel to display. An incremental intensity is identified by a table indexing technique. The second sequence is the result of performing a data compression method on two sets of transitions. Each set is derived from an input scan line by noting the run length between changes in intensity. Intensities in one embodiment have single bit resolution. A subset of transitions is identified by a table indexing technique. Disk writes are delayed until a buffer has exceeded a limit value.

41 Claims, 6 Drawing Sheets

| BIT PATTERN (BINARY) | | | | FLIP POSITION LIST | | RUN LENGTH LIST |
|---|---|---|---|---|---|---|
| 4 | 3 | 2 | 1 | PRIOR 0 | PRIOR 1 | |
| ← | | | | | | |
| 0 | 0 | 0 | 0 | 0 | 1,0 | 4,−1 |
| 0 | 0 | 0 | 1 | 1,2,0 | 2,0 | 1,3,−1 |
| 0 | 0 | 1 | 0 | 2,3,0 | 1,2,3,0 | 1,1,2,−1 |
| 0 | 0 | 1 | 1 | 1,3,0 | 3,0 | 2,2,−1 |
| 0 | 1 | 0 | 0 | 3,4,0 | 1,3,4,0 | 2,1,1,−1 |
| 0 | 1 | 0 | 1 | 1,2,3,4,0 | 2,3,4,0 | 1,1,1,1,−1 |
| 0 | 1 | 1 | 0 | 2,4,0 | 1,2,4,0 | 1,2,1,−1 |
| 0 | 1 | 1 | 1 | 1,4,0 | 4,0 | 3,1,−1 |
| 1 | 0 | 0 | 0 | 4,0 | 1,4,0 | 3,1,−1 |
| 1 | 0 | 0 | 1 | 1,2,4,0 | 2,4,0 | 1,2,1,−1 |
| 1 | 0 | 1 | 0 | 2,3,4,0 | 1,2,3,4,0 | 1,1,1,1,−1 |
| 1 | 0 | 1 | 1 | 1,3,4,0 | 3,4,0 | 2,1,1,−1 |
| 1 | 1 | 0 | 0 | 3,0 | 1,3,0 | 2,2,−1 |
| 1 | 1 | 0 | 1 | 1,2,3,0 | 2,3,0 | 1,1,2,−1 |
| 1 | 1 | 1 | 0 | 2,0 | 1,2,0 | 1,3,−1 |
| 1 | 1 | 1 | 1 | 1,0 | 0 | 4,−1 |

SYSTEM AND METHOD FOR PROCESSING PIXELS FOR DISPLAYING AND STORING

FIELD OF THE INVENTION

This invention relates to systems for monitoring document scanning processes and to methods for processing pixels for display and storage.

BACKGROUND OF THE INVENTION

A scanner is a computer peripheral that when presented with an image, produces a scanner output signal for use by digital electronic equipment, such as a computer. Prior to operating on the graphic information conveyed by the scanner output signal (for example, cropping, sizing, etc.), the equipment or computer usually creates a file for storing the graphic information as it is produced.

The smallest element of a graphic image as scanned (or as used by a computer) is called a pixel, short for picture element. A scanner output signal describes the color and brightness of each pixel in each horizontal line scanned across the image. Each line is called a scan line. Because a scan line is ordinarily one pixel thick in the vertical direction, the scanner output signal describes hundreds of scan lines, each a minute vertical distance along the image until the full image has been reported.

Small pixel dimensions provide for high resolution scanning, yet high resolution raster signals tend to require large files for retaining information about an enormous number of pixels. A smaller file can be produced when redundant information provided by the scanner output signal is removed by conventional data compression algorithms.

Unfortunately, conventional data compression algorithms exhibit an unpredictable delay in compressing the scan signal from a particular image. Complex images require more data compression time due to many changes in pixel intensities. Because not all images are complex, system throughput is slowed when images are input to a scanner with intervening delay of a prescribed maximum time.

A scanner operator may be required to present an image more than once due to incomplete or undesirable scanned results. For example, when a sequence of complex images is presented, loss of scanned data may occur. In such a case the operator must make repeated attempts to scan the offending image and often repeat scanning of some or all of the images following it. Operator intervention to reattempt scanning may also be required when an image is not in proper orientation, when an exposure of the image needs to be adjusted for contrast or color, when an image is misaligned, or when the image is incomplete as when a page fold covers part of an image.

In view of the problems described above and related problems, the need remains for systems for monitoring scanning processes and for methods for processing pixels for display and storage.

SUMMARY OF THE INVENTION

A system in one embodiment of the present invention includes a processor that performs a method for processing pixels for displaying and storing. Each pixel has a position within a sequence and has an intensity of a particular resolution. The method includes the steps of: (a) receiving a first sequence of pixels; (b) revising a second sequence of pixels to be provided for displaying; (c) providing a third sequence, each member of the third sequence identifying a respective position of a pixel in the first sequence and an adjacent pixel of different respective intensities; and (d) providing a fourth sequence for storing, the fourth sequence resulting from performing a data compression method on the third sequence. An intensity of a pixel of the second sequence is revised in response to respective intensities of a plurality of pixels of the first sequence. The resolution of the pixel of the second sequence is greater than the resolution of a pixel of the plurality. Revising in step (b) and providing in step (c) each include respective instructions that account for multiple pixels of the plurality.

A system in another embodiment of the present invention includes a processor that performs a method for processing pixels for displaying and storing. Each pixel has a one-bit intensity and a position within a scan line. The one-bit intensity is in a first state for image (marking) and in a second state for background (spacing). The method includes the steps of: (a) receiving a first group of four pixels, each adjacent to the others in two adjacent scan lines; and (b) determining a first output one-bit pixel intensity in the second state only when a first quantity of pixel intensities among the four pixels in the second state is a majority and otherwise only when the first quantity in the first state is 2 and the pixels having respective intensities in the first state are diagonally opposed.

In yet another system, the above method additionally includes steps (c) repeating steps (a) and (b) for a second group of four pixels in the same scan lines and adjacent to the first group so that a second output one-bit pixel intensity is determined; (d) establishing a respective scan line position for the first output pixel and for the second output pixel, the respective scan line positions being adjacent; (e) appending a member to a first sequence, the member identifying the respective scan line positions when the first output pixel intensity and the second output pixel intensity differ; and (f) providing a second sequence for storing, the second sequence resulting from performing a data compression method on the first sequence.

BRIEF DESCRIPTION OF THE DRAWING

A preferred exemplary embodiment of the present invention is described below with reference to the drawing in which.

DETAILED DESCRIPTION OF THE PREFERRED EMBODIMENT

The present invention may be embodied in any system that scans images. Such a system suitably includes any group of components that interact to accomplish a computational or measurement task. For example, system 100 of FIG. 1 includes scanner 110 coupled by link 111 to scanner controller 112; printer 136 coupled by link 135 to printer controller 134; monitor 132 coupled by line 131 to video controller 130; disk 128 coupled by link 127 to disk controller 126; I/O bus 114 supporting controllers 112, 134, 130, 126, and 116; bus bridge and main memory controller 116; main memory 120 coupled to bridge 116; and central processor 122 and cache memory 124 each coupled to local bus 118 which also serves bridge 116.

Figure 1:
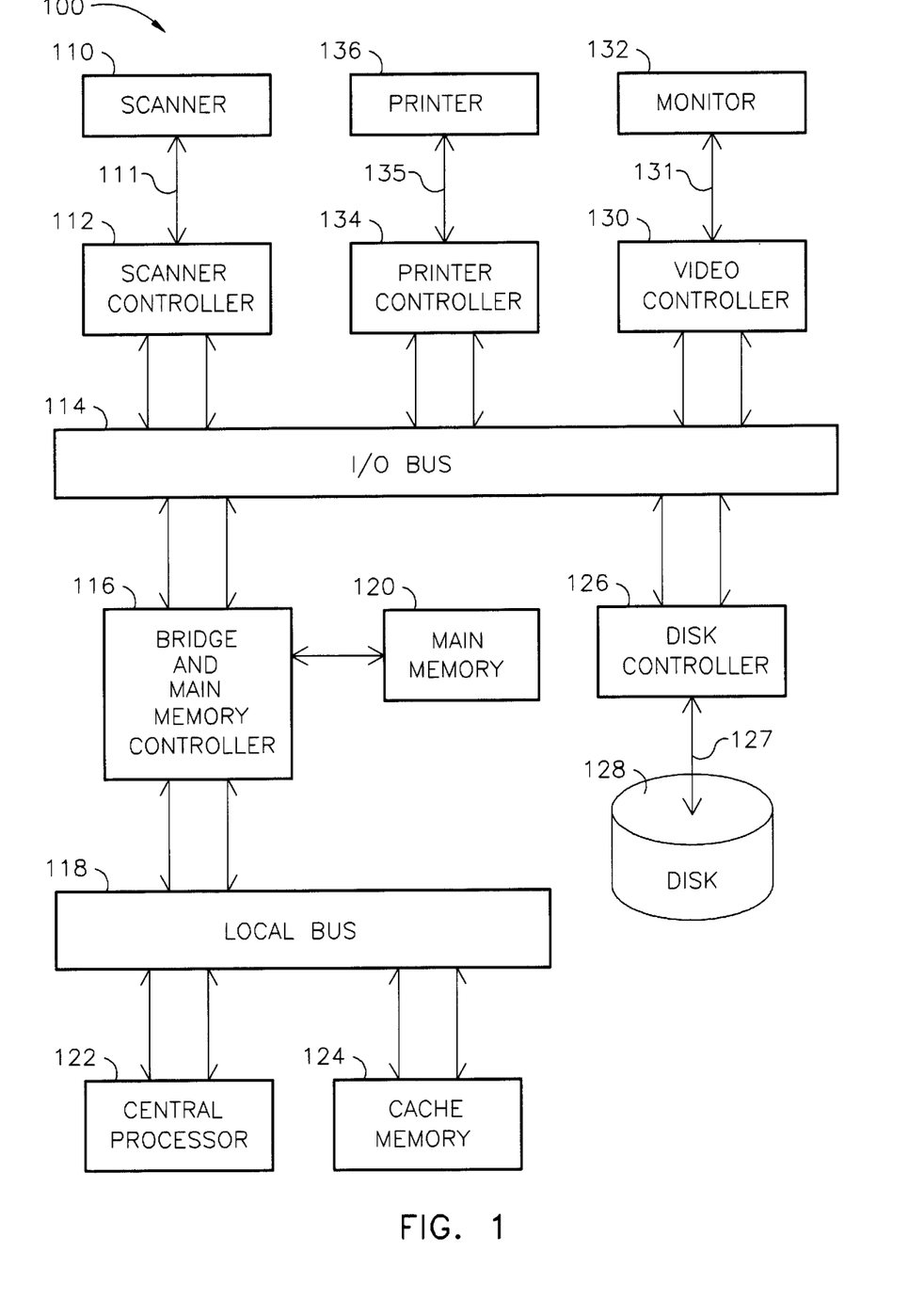
FIG. 1 is a functional block diagram of a system in one embodiment of the present invention.

Central processor 122, cache memory 124, local bus 118, bridge 116, main memory 120, I/O bus 114, video controller 130, and disk controller 126 cooperate to support a general purpose operating system. System 100 performs an application program, such as a word processing application program in cooperation with an operating system, such as Windows marketed by Microsoft of Redmond, Wash. In a variation of system 100, these components may additionally cooperate as a personal computer, a general purpose workstation, or an embedded computer based control system such as a dedicated process controller, a document handling system, an accounting system, an instrumentation system, or a measurement system.

I/O bus 114 provides channels for communication between controllers coupled to I/O bus 114. I/O bus 114 suitably includes any communication channel between input/output device controllers and a central processor. For example, I/O bus 114 is of the type known as a PCI bus specified by the PCI Special Interest Group of Portland, Oreg. Controllers 134, 130, 126, and 116 match the PCI bus specification and support the conventional functions associated with the peripheral I/O devices to which they are individually coupled.

Monitor 132 suitably includes any image display subsystem for informing an operator or user. If desired, user input for operation of system 100 is obtained via conventional touch-screen inputs, and communicated to the operating system and application programs via a video controller. For example, monitor 132 is a conventional color graphics video monitor capable of displaying a replica of a scanned image and a suitable system control virtual front panel for guiding user inputs. Alternatively, another conventional input subsystem may be used, for example, a light pen, mouse, bit tablet, keyboard, or a combination of such subsystems.

Printer 136 suitably includes any image printing subsystem for providing a hard copy of a scanned image. For example, printer 136 is a conventional monochrome laser printer, that, when directed by user input and a suitable application program, prints a scaled or full size replica of the image scanned by scanner 110. The hard copy presents a display of the image, and, in one variation, the monitor is omitted and the printer is used exclusively for image displaying.

Disk 128 provides data storage under the direction and control of a computer system. For example, disk 128 represents one or more conventional disk drives used in part for the storage of files for images scanned by scanner 110.

Scanner 110, when presented with an image, produces a scanner output signal for use by a computer. Scanner 110 suitably includes a conventional monochrome document scanner for document pages presented manually one at a time. The scanner output signal produced by scanner 110 includes a conventional header followed by 14,400 pixels per scan line. Pixel values are output in 4-bit nibbles and are clocked by conventional control signals. Each nibble includes a pixel value for each of four one-bit pixels. The pixel value specifies the intensity (on or off) of each pixel. Alternatively, scanner 110 may include a conventional scanner that, when presented with a color image, provides intensity values in three color planes via an output signal having clocked bytes.

A link from a peripheral device to a respective controller suitable includes any interface that supports status reporting from the device and device control signals from the controller. For example, links 111, 135, 131, and 127 support status and control operations. If desired, any or all of these links may provide additional functions including operations that are remote from I/O bus 114 (for example, infrared links), shared access by other controllers via I/O bus 114, and conventional network functions.

Figure 2:
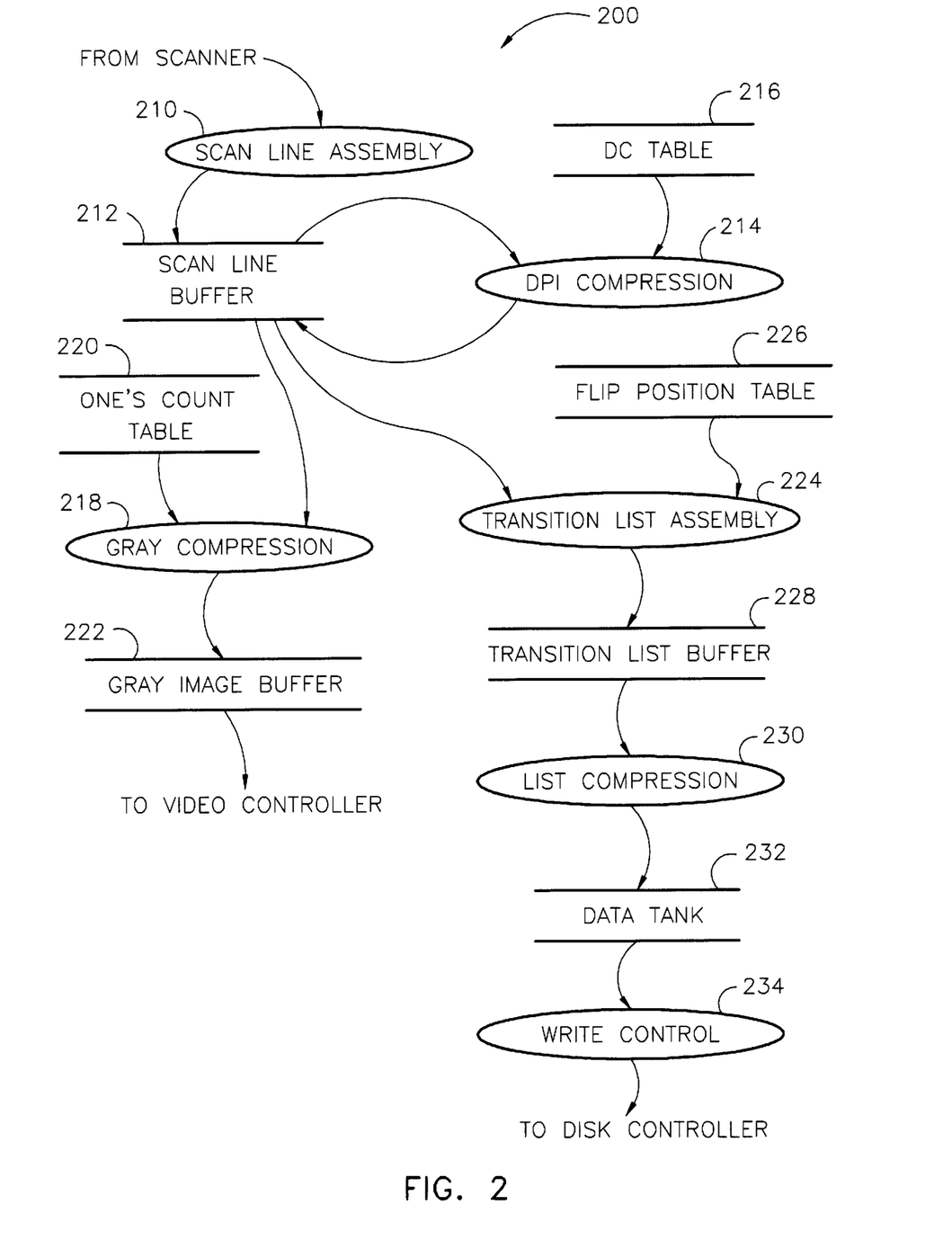
FIG. 2 is a data flow diagram of a method performed on one embodiment of the system of FIG. 1.

System 100 supports image scanning, displaying, and storage using one or more processors and methods performed by the processor or processors. For example, method 200 of FIG. 2 is a description of a method for image scanning, displaying, and storage that may be implemented on one or more processors. In FIG. 2, a conventional data flow diagram, method 200 receives data from a scanner, applies gray compression to the received data, and provides gray image data to a video controller for displaying on a monitor. Method 200 also, applies a DPI compression, applies transition list compression, and provides compressed data for storage, for example on a disk.

Any scan line assembly process receives portions of a scan line from a scanner and places each portion in a data structure for further operations on each scan line as a whole. For example, data from a scanner as input to scan line assembly process 210 may correspond to the sequence of nibbles 300 of FIG. 3. Each nibble has 4 single-bit pixels. In sequence 300, consecutive nibbles originate from two adjacent scan lines, designated L1 and L2. Each nibble is further identified in FIG. 3 as to its position in scan line buffer 400 of FIG. 4. Scan line buffer 400 consists of 450 32-bit words for storing scan line L1 followed by 450 32-bit words for storing scan line L2. Each scan line has 14,400 single-bit pixels. Each word provides storage for 8 nibbles, identified as nibbles A through H.

Figure 3:
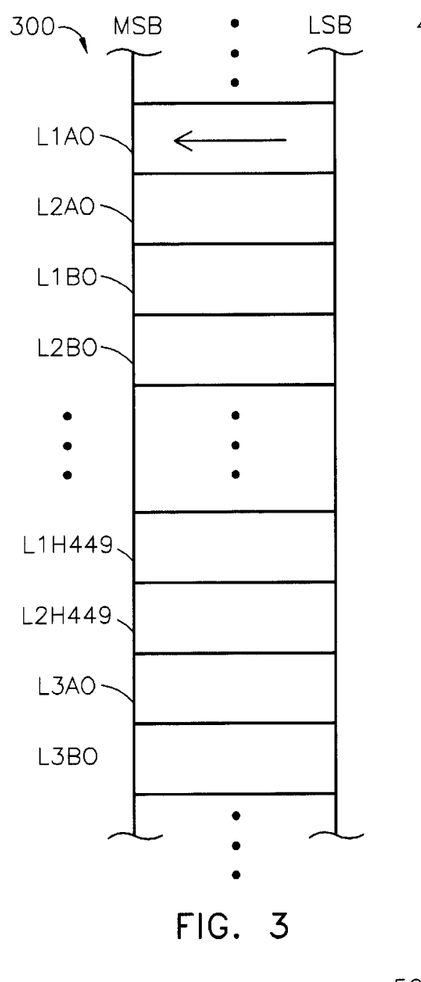
FIG. 3 is a diagram of data from a scanner as received and processed in one embodiment of the method of FIG. 2.
Figure 4:
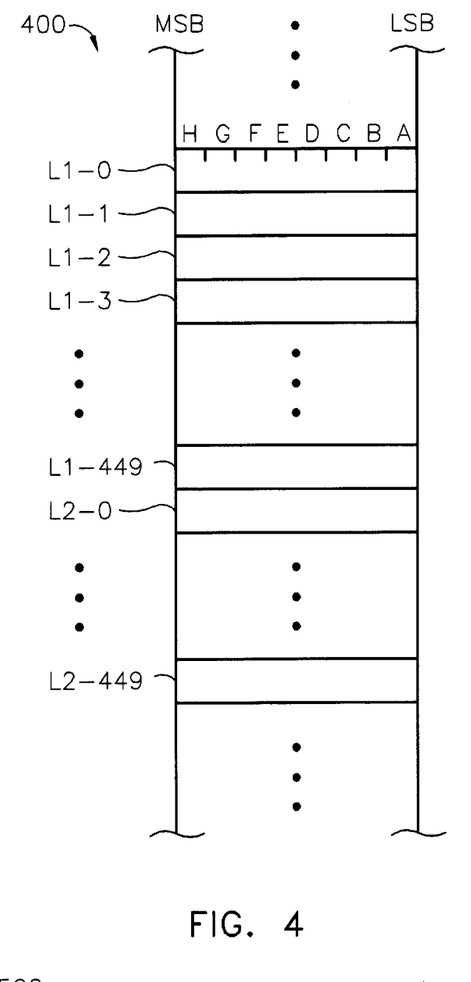
FIG. 4 is a diagram of a scan line buffer as maintained in one embodiment of the method of FIG. 2.

Operation of scan line assembly process 210 for this illustrative input data configuration and scan line buffer configuration is now apparent from the consistent references made in FIGS. 3 and 4: the nibble L1A0 of FIG. 3 corresponds to the first nibble A of scan line L1 and is placed in scan line buffer 400 of FIG. 4 in word L1-0 at position A, the least significant 4 bits; the next received nibble L2A0 of FIG. 3 is placed in scan line buffer 400 of FIG. 4 in word L2-0 at position A; the third received nibble L1B0 of FIG. 3 is placed in scan line buffer 400 of FIG. 4 in word L1-0 at position B; and so on.

Any scan line buffer suitably includes a data structure that provides efficient access to multiple scan lines and preserves the adjacency relationships among pixels of the same scan line and of pixels in consecutive scan lines. For example, scan line buffer 212, 400 provides adjacency among pixels of the same scan line by storing nibbles A through H in the scan line direction as indicated on nibble L1A0 of FIG. 3. Adjacent pixels from two consecutive scan lines are located in the same nibble position and a constant 450 addresses apart.

Any scan line buffer provides access to a scan line until that scan line is no longer needed. The quantity of scan lines retained in a scan line buffer is limited by the extent of available memory and depends on maximum expected delays through a list compression process. For example, scan line buffer 212 provides storage for 64 scan lines. A larger or smaller quantity of two or more scan lines may be sufficient in some systems.

Figure 5:
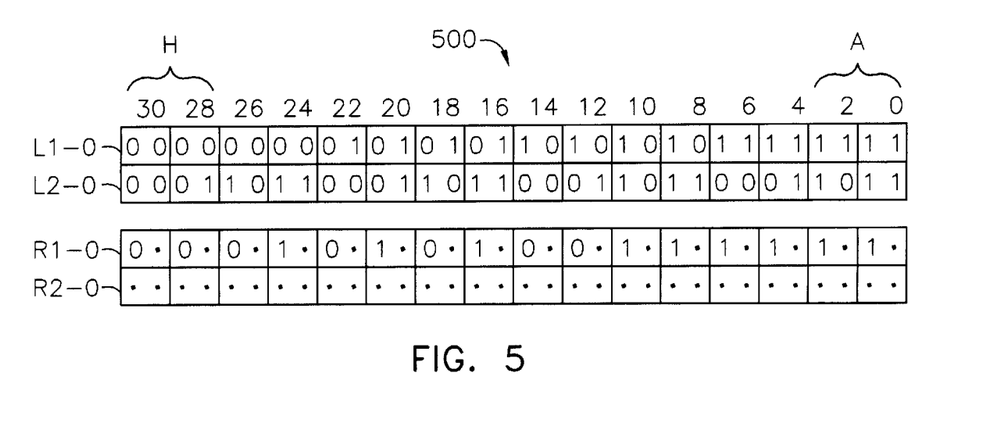
FIG. 5 is a diagram of pixels input to and provided by the DPI compression process in one embodiment of the method of FIG. 2.

Any dots per inch (DPI) compression process combines adjacent pixel values in a source group of pixels according to a translation definition to produce adjacent pixel values in a result group of pixels having fewer pixel values than the source. For example, when compressing four 1-bit pixel values into one 1-bit pixel value, a DPI compression process combines pixel values from a selected square matrix of 4 pixel values, the square being formed from two adjacent scan lines. In particular, for the portion of scan lines illustrated in FIG. 5, each nibble from scan lines L1 and L2 corresponds to two 4-bit source matrices and each corresponding nibble of scan lines R1 and R2 provides the DPI compression result. A dot in a pixel value of a result matrix indicates an unused bit. The sixteen different possible 4-bit source matrices and result matrices shown in FIG. 5 provide a complete translation definition 500 for four to one compression.

In definition 500, adjacent scan line portions L1-0 and L2-0 form sixteen square four-bit source matrices. Scan lines R1-0 and R2-0 illustrate sixteen result matrices, corresponding positionally with each source matrix. For example, the matrix composed of all "1" bits is shown at word L1-0, bit positions 1 and 0 and word L2-0, bit positions 1 and 0. The matrix identified by DPI compression process 214 occupies word R1-0, bit positions 1 and 0 and word R2-0, bit positions 1 and 0. Note that the result is "1" only when source matrix "0" bits are not opposed on either diagonal. The result of DPI compression is preferably stored in scan line buffer 212, overwriting the scan portions being compressed.

Figure 6:
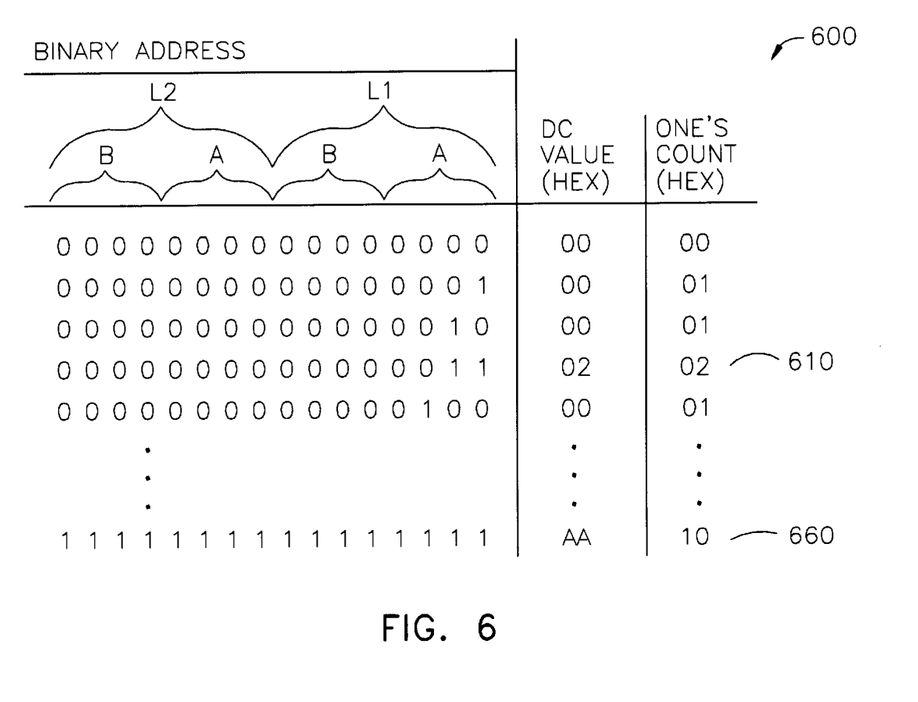
FIG. 6 is a diagram of the contents of the One's Count Table and the DC Table in one embodiment of the method of FIG. 2.

Any DPI compression (DC) table suitably includes a data structure that provides the result of applying a translation definition without testing individual bits. For example, DC table 216 provides results for several matrices simultaneously. To use DC table 216, an array address is formed from the pixel values to be tested. Then, the result is obtained by recalling an array element from the table as indexed by the address. For example, adjacent nibbles A and B from adjacent scan lines L1 and L2 form a sixteen bit address. The DC values shown in the right hand column of Table 600 of FIG. 6 are obtained using such a sixteen bit address. If, for instance, all bits of adjacent nibbles A and B from scan lines L1 and L2 were "1", a DC value from row 660 of hexadecimal "AA" is obtained. A similar result is shown in FIG. 5, word R1-0 bits 0-7, unused bits being "0".

Any gray compression process suitably includes a scale to gray process which combines the intensity values of many pixels each having low intensity resolution into one intensity value for one pixel having higher intensity resolution. For example, gray compression process 218 combines 256 1-bit pixel intensity values from 256 pixels into one 8-bit intensity value for one pixel. Gray compression process 218 performs data flow 700 of FIG. 7. For a region 710 having adjacent 16-bit portions of sixteen scan lines L1-0 through L1-15, the number of 1-bit intensity values set to "1" will be in the range from 0 to 255. An 8-bit byte integer value has a corresponding range. Therefore, a count of intensity values that are set to "1", when accumulated in single byte 712, provides the desired result intensity for one pixel.

Figure 7:
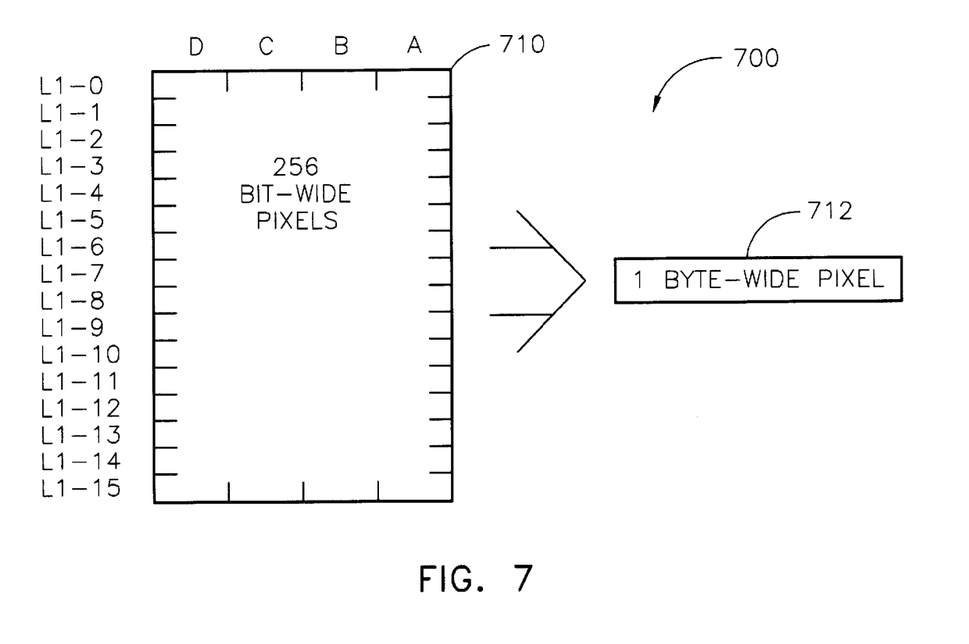
FIG. 7 is a diagram of the effect of gray compression in one embodiment of the method of FIG. 2.

For gray compression process 218, the compression ratio expressed in pixels is 256:1, sufficient for compressing a 24-inch by 36-inch drawing sheet having 9,600 scan lines by 14,400 pixels per scan line (at 400 DPI) for presentation on a monitor (or printer) as an image having 600 pixels vertically and 900 pixels horizontally.

Any one's count table suitably includes a data structure that provides the result of counting 1-bit intensity levels set to "1" without testing individual bits. For example, one's count table 220 provides the result of counting 1-bit intensity levels set to "1" for any sixteen 1-bit pixels. To use ones's count table 216, an array address is formed from the pixel values to be tested. Then, the result is obtained by recalling an array element from the table as indexed by the address. For example, adjacent bits from nibbles A, B, C, and D from scan line portion L1-0 as shown in region 710 of FIG. 7 form a sixteen bit address. The one's count values shown in the middle column of Table 600 of FIG. 6 are obtained using such a sixteen bit address. If, for instance, the adjacent nibbles form an address of binary value 3, then a one's count value from row 610 of hexadecimal "02" is obtained.

Any gray image buffer suitably includes a data structure that provides pixel values resulting from gray compression in any convenient arrangement for forming a raster display. For example, gray image buffer 222 provides a conventional two-dimensional array of 8-bit pixel intensity values sufficient for the entire display area of a monitor such as monitor 132 or printer such as printer 136.

Any transition list assembly process forms a compressed representation of a scan line by listing scan line positions where a change of intensity occurs between adjacent pixels. A scan line portion that includes a first group of adjacent pixels having the same first intensity followed by a second group of pixels having the same second intensity, different from the first intensity, is compressed to one pixel position value to identify the position where the first group ended and the second group began. No pixel intensity information is lost, since it is possible to recreate the original scan line from a transition list. For example, in a scan line having pixels having 1-bit intensity values, the intensity of each group of pixels need not be stored with each transition entry since the identity of the current pixel intensity value can be derived from the context of transitions and a default prior intensity.

Any flip position table suitably includes a data structure that provides transition list values without testing individual pixel intensity values. For example, flip position table 226 is an array of pointers to variable length lists of positions. For 1-bit pixel intensity values, transition positions for transitions from "0" to "1" and from "1" to "0" in all combinations may be stored in a one-dimensional array of pointers. A group of pixel values is concatenated in the order of the scan direction to form an address. The address is used as an index to retrieve one or more pointers from the array. Each pointer identifies the appropriate predetermined transition list.

Figure 8:
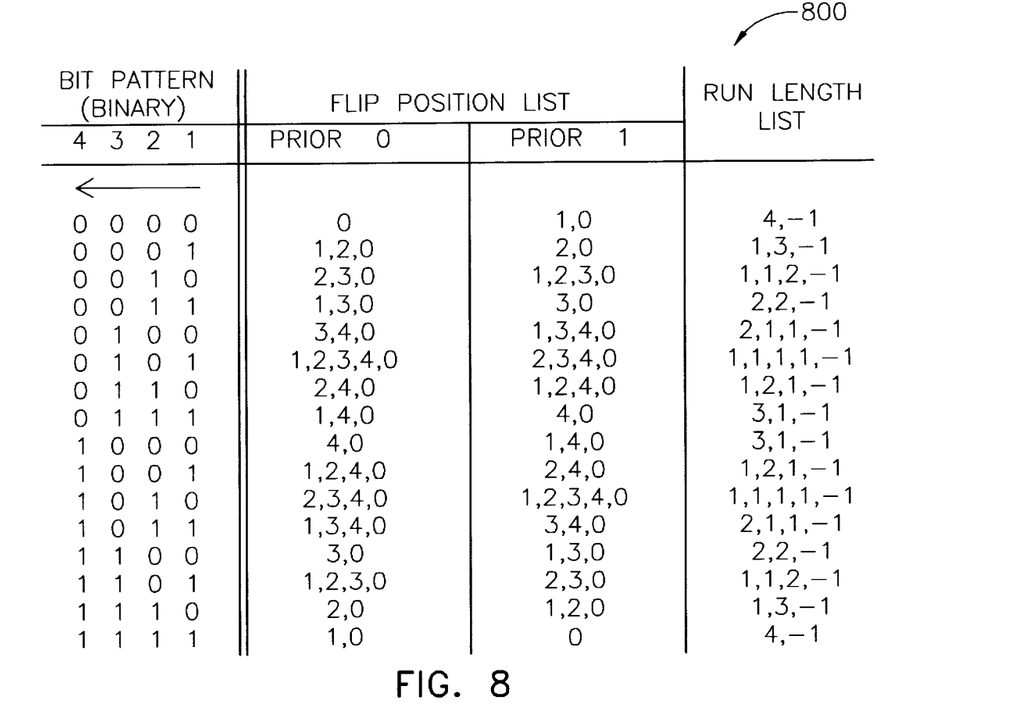
FIG. 8 is a diagram of the contents of the Flip Position Table in one embodiment of the method of FIG. 2.

In a first configuration, illustrated in the first three columns in table 800 of FIG. 8, each element of the pointer array specifies a first pointer to a list based on an intensity of "0" prior to the group of pixel intensities used to form the address and a second pointer to a list based on an intensity of "1" prior to the group of pixel intensities used to form the address. The arrow in the first column identifies the scan direction. Each list contains integer bit position values relative to the position of each transition in the address, terminated with an invalid position, for example "0".

In a second configuration, each array element specifies only the first pointer as described above. For the condition that the intensity prior to the group of pixel intensities used to form the address was "1" instead of "0", the address formed by the group of intensities is first bit-wise inverted and the pointer from the element so indexed identifies the appropriate list of transitions.

In a third configuration, each array element specifies only one pointer, however, the pointer identifies a list of run length values instead of position values as above. A run length value is an integer specifying the count of same-intensity pixels progressing in the scan direction. For instance, the row of table 800 having binary address "0100" identifies a run length list that describes two "0"s, followed by one "1", followed by one "0", and terminated with an invalid run length of negative one. A preferred flip position table 226 follows the design illustrated by table 800 in this third configuration. When processing nibble length (4-bit) portions of a scan line, position values relative to the beginning of a scan line (e.g. positions 1 to 14,400) are easily calculated from the sum of a run length of the run length list and a reference position value computed with an increment of 4 for each successive nibble.

Any transition list buffer provides storage and access to transition lists not yet considered for list compression. For example, when a list compression process operates on two complete, adjacent scan lines, a transition list buffer provides two complete transition lists for each execution of the list compression process. A transition list assembly process in one variation indicates to a list compression process that a transition list is complete by storing status of the list in the transition list buffer along with each transition list. For instance, transition list buffer 228 is a data structure having a circular access method supporting reuse of memory. Buffer 228 provides first in first out (FIFO) storage for variable length transition lists for up to 16 scan lines. More storage space is needed in buffer 28 to avoid overwriting of data during delays between processing of transition lists by list compression process 230.

Any list compression process codifies input data to provide codified data that is usually more compact. Data in more compact form occupies less space when stored and can be moved, copied, stored, and recalled more quickly because of its smaller size. For example, a list compression process may employ a conventional data compression method on adjacent data to enhance recognition and removal of redundancy. For instance, list compression process 230 employs a method on two transition lists developed from adjacent scan lines known as Group IV compression, widely used for facsimile communications.

Any data tank synchronizes a data generating process with a data consuming process. For example, a data tank between a compression process receives data in varying quantities and at frequent (and possibly irregular) intervals and provides data in larger quantities at fewer (and possibly regular) intervals. For instance, data tank 232 is a FIFO memory having a maximum size.

Any write control process cooperates with a data tank to provide data to a disk controller for storage. By issuing commands and monitoring the status of a disk controller, a write control process improves the efficiency of data storage by reducing delay, reducing physical movement in the disk drive mechanism. For example, write control 234 maintains a current size of data tank 232 reflecting the amount of data received into the tank and not yet provided for storage. As additional data is received into tank 232 having a received size, write process 234 increases the current size by the received amount. Routinely, the current size is compared to a threshold, for example set at 75% of the tank's maximum size. In a preferred embodiment, the threshold is set to avoid the possibility that data may be lost during worst case conditions, including processing of scan lines of maximum complexity. When the current size exceeds the threshold, an amount of data is removed from tank 232, the current size is decreased accordingly, and the removed data is passed to a disk controller for storage on disk. The amount of data to be removed is determined by conventional techniques with reference to disk parameters such as sector size and disk controller timing.

System 100 of FIG. 1 and method 200 of FIG. 2 may be realized in several variations which differ in the extent that operations of method 200 are performed by general purpose circuitry under software or firmware control as opposed to special purpose circuitry under microcode or logic circuit control. In a first variation, central processor 122 performs software for accomplishing method 200 and main memory 120 provides storage space for all data structures used by method 200.

In a second variation, scanner controller 112 includes a processor and memory for performing one or more of: scan line assembly process 210, gray compression process 218, DPI compression process 214, transition list assembly 224, and list compression 230, with the remaining process performed by central processor 122. Either memory on scanner controller 112, main memory 120, or both may be suitably employed for appropriate data structures.

In a third variation (an example of the second variation), scanner controller 112 includes a scan data processor (a special purpose circuit) to accomplish scan line assembly process 210, DPI compression process 214, gray compression process 218, transition list assembly process 228, list compression process 230, and write control process 234. Scan controller 112 also includes memory for scan line buffer 212, DC table 216, one's count table 220, gray image buffer 222, flip position table 226, transition list buffer 228, and data tank 232.

Any scan data processor processes data from a scanner for facilitating image data storage and display. For example, scan data processor 900 of FIG. 9 includes: scan line assembler circuit 902, DPI compression circuit 904, transition list processor 906, gray compression circuit 907, video interface 908, and control circuit (omitted for clarity). Scan data processor 900 may be designed and assembled using conventional integrated circuit development and manufacturing techniques.

Figure 9:
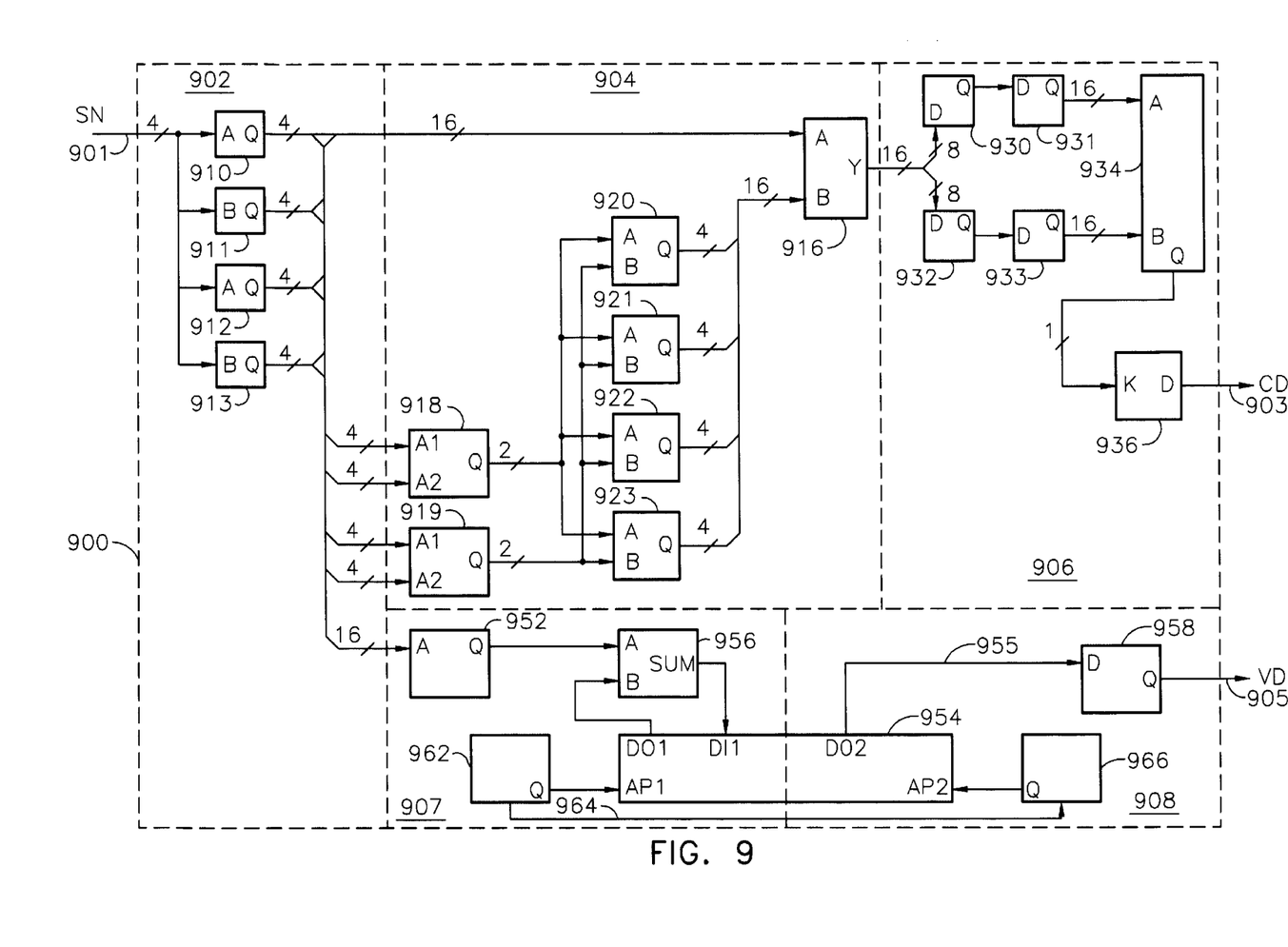
FIG. 9 is a functional block diagram of a circuit in one embodiment of the present invention.

Any scan line assembler circuit performs a scan line assembly process. For example, scan line assembler circuit 902 performs scan line assembly process 210, discussed above. Circuit 902 includes four 4-bit latches that receive nibbles from a scanner and provide two 8-bit bytes from each of two scan lines for further processing. Latches 910 and 911 receive nibbles conveyed by signals SN on interface 901 and provide bytes for a first scan line; and, latches 912 and 913 receive nibbles conveyed by signals SN on interface 901 and provide bytes for a second scan line. Latched data remains available for a designed latency period. When a desired latency may cause loss of data in latches 910–913, latches 910–913 are equipped with FIFO storage capability and control.

Any DPI compression circuit performs a DPI compression process. For example, DPI compression circuit 904 performs DPI compression process 214, discussed above. DPI compression circuit 904 includes identical read only memories (ROM) 918 and 919 that perform DPI compression using the 16-bit address to 4-bit compressed result technique described above. Latching multiplexers 920–923 form two 8-bit bytes, one byte for each of two consecutive compressed scan lines. Multiplexer 916 provides either the uncompressed or the compressed scan line portions of two consecutive scan lines to transition list processor 906.

Figure 10:
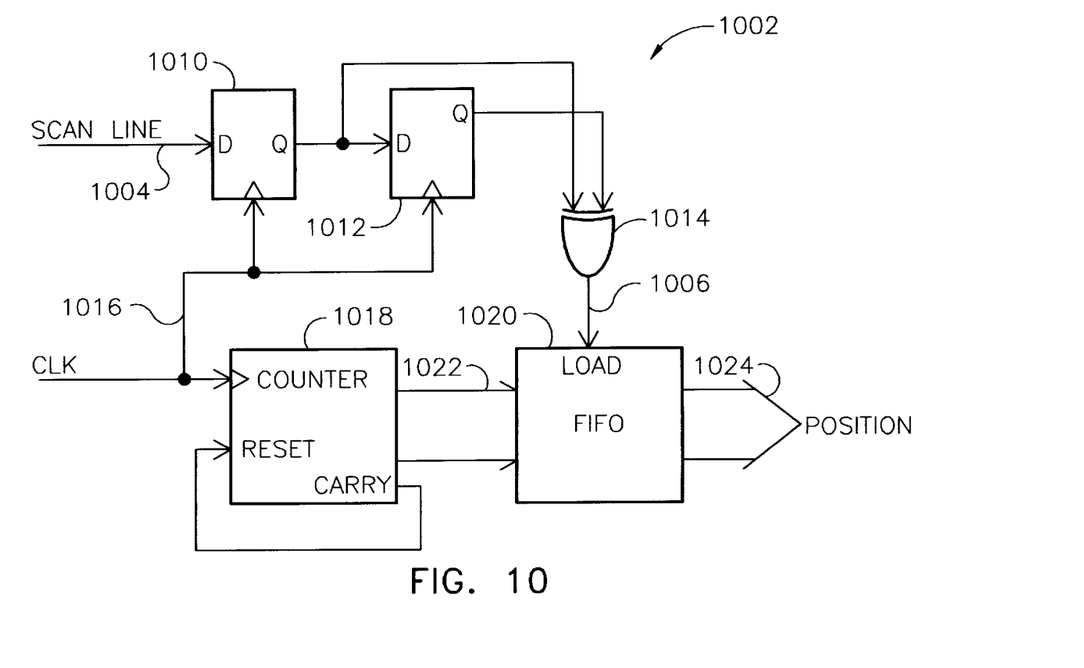
FIG. 10 is a functional block diagram of a transition list generation circuit in one embodiment of the circuit of FIG. 9.

Any transition list processor performs a transition list assembly process, a list compression process, and a write control process. For example, transition list processor 906 performs transition list assembly process 224, list compression process 230, and write control process 234 to provide codified data to a disk controller. Transition processor circuit 906 includes parallel to serial shift registers 930 and 932 for converting pixel intensities in 8-bit bytes to a serial stream of 1-bit pixel values. Identical circuits 931 and 933 each perform transition list assembly for a separate scan line by employing a position detection circuit and a memory for accumulating short transition lists for a portion of a scan line to form one longer transition list for an entire scan line. Each integer of the longer transition list can represent a scan line position of up to 65,536 because each circuit 931 and 933 provides a 16-bit output. Compression processor 934 applies a Group IV compression algorithm in response to two adjacent scan line transition lists from circuits 931 and 937 to provide codified data in a serial output. Circuit 936 performs the functions of data tank 232 and the method of write control process 234 to provide serial codified data signals CD at interface 903.

Any gray compression circuit performs a gray compression process. For example, gray compression circuit 907 performs gray compression process 218, discussed above. Gray compression circuit 907 includes read only memory (ROM) 952, adder 956, dual-port random access memory (RAM) 954, address generators 962 and 966, and memory 958.

ROM 952 performs one's counting using the 16-bit address to 8-bit compressed result technique described above. Each result from ROM 952 corresponds to one increment to be added to an appropriate byte-wide pixel value. Eight bits from each of two adjacent scan lines are presented as the address to ROM 952; as opposed to sixteen bits from one scan line as discussed with reference to FIG. 7. Nevertheless, sixteen increments are made to accomplish the 256:1 pixel compression ratio discussed above.

Adder 956 adds the byte-wide increment from ROM 952 to the intermediate value from RAM 954 as addressed by address generator 962. The resulting sum updates the addressed intermediate value in RAM 954. On the sixteenth pass through adder 956, address generator 962 signals address generator 966 via line 964. On receiving a suitable signal on line 962, read-out of byte-wide pixel values from the second port of RAM 954 to memory 958 proceeds as addressed by counter 966. When read-out is completed (individually or as a whole), each byte-wide pixel value is cleared to prepare for reuse as an intermediate value.

Memory 958 performs the functions of a gray image buffer retaining one or more scan lines of gray compressed pixels. Memory 958 is a conventional memory circuit designed to match the requirements of signal VD on interface 905.

Any video interface suitably includes a circuit that meets input requirements for presenting pixel intensities to a monitor or printer. In a first version, for example, video interface 908 meets the input requirements for monitor 132. Video data signal VD includes each byte-wide pixel value in bit-serial order on interface 905 with conventional control signals, not shown. Memory 958 in this version includes a conventional parallel to serial circuit.

In a second version, video interface 908 meets the input requirements for printer 136. Video data signal VD includes each byte-wide value in byte-serial order on interface 905 with conventional control signals, not shown.

In other versions, video interface 908 meets the input requirements of video controller 130 or printer controller 134 and communicates as a bus master via I/O bus 114. Video data signal VD in this version includes each byte-wide pixel value with conventional control signals, not shown, according to a message format consistent with I/O bus 114.

A control circuit for the architecture of scan data processor 900 is designed and assembled using conventional development and manufacturing techniques. For example, in one variation, a state machine design generates load, store, clear, clock, and handshake signals to match the sequence of operations described for method 200 and as required to meet timing constraints of a particular scan data processing application.

Any position detection circuit provides a series of integer position values from intensity transitions detected on a serial input of pixel values. For example, position detection circuit 1002 provides integer position values in response to serial 1-bit pixel values as conveyed by signal SCAN LINE on line 1004. Circuit 1002 includes flip-flops 1010 and 1012 cooperating as a shift register to provide a pair of pixel values for intensity difference comparison; exclusive-OR gate 1014 that provides a load command for entering a position integer value into FIFO 1020 when an intensity transition is detected; and counter 1018 that provides a position integer for each scan line position in signal SCAN LINE. Counter 1018 resets on occurrence of the maximum appropriate count for the SCAN LINE signal, for example 14,400 for a scan line having 14,400 1-bit pixels.

The foregoing description discusses preferred embodiments of the present invention, which may be changed or modified without departing from the scope of the present invention. For example, a data storage medium includes recording devices and materials including a nonremovable media hard disk system, a removable flexible disk system, a magnetic tape system, magnetic media for such systems, a CDROM system, a magnetic/optical disk system, optical medica for such systems, a semiconductor memory system, and a semiconductor device for such a system.

Such data storage media are conventionally used to record and provide access to indicia of instructions that direct a processor to perform a method. Indicia are of conventional types including known magnetic and optical data recording formats and signaling, including compressed and secure formats. Such data storage media are also conventionally used to provide access to data structures. The form of data structures or instructions include the forms prepared for use by a processor, and other conventional forms including instructions in any programming language, or intermediate form produced during program development.

A value (for example, a pixel value, scan line position, array address, or data word in an image buffer) is "identified" in any of several ways: (a) by providing the value explicitly, (b) by providing a parametric definition so that the value may be derived, (c) by providing a reference that locates the value in storage, or (d) by a combination or iteration of such parametric definitions or references.

Compression may be either lossless or lossy. In system 100, discussed above, list compression is lossless and results may not always be more compact. Further, DPI compression and gray compression are lossy. In other variations list compression, DPI compression, and gray compression may be lossy or lossless, as desired.

For a scanner or printer, resolution refers to the number of dots (pixels) per unit of dimension (e.g. horizontal length, or vertical height). For a display, resolution refers to the number of pixels in the screen as a whole. A high resolution graphic image may have a large number of pixels per unit of dimension as scanned or printed, or may have a large number of pixels in the image as a whole. The resolution of an intensity value describes the range of values from which a particular intensity value is assigned. For example a 1 bit resolution implies a range of 2 values; and, an 8-bit resolution implies a range of 256 values.

These and other variations and modifications are intended to be included within the scope of the present invention. While for the sake of clarity and ease of description, several specific embodiments of the invention have been described; the scope of the invention is intended to be measured by the claims as set forth below. The description is not intended to be exhaustive or to limit the invention to the form disclosed. Other variations of the invention will be apparent in light of the disclosure and practice of the invention to one or ordinary skill in the art to which the invention applies.

What is claimed is:

1. A data storage medium having recorded indicia comprising instructions for a processor to perform a method for processing pixels for displaying and storing, each pixel having a position within a sequence and having an intensity, the intensity having a resolution, the method comprising:

receiving a first sequence of pixels;

revising a second sequence of pixels to be provided for displaying, the intensity of a pixel of the second sequence being revised in response to respective intensities of a plurality of pixels of the first sequence, wherein revising comprises a first instruction that accounts for multiple pixels of the plurality;

providing a third sequence, each member of the third sequence identifying a respective position of a pixel in the first sequence and an adjacent pixel of different respective intensities, wherein providing comprises a second instruction that accounts for multiple pixels of the first sequence; and providing a fourth sequence for storing, the fourth sequence resulting from performing a data compression method on the third sequence.

2. The data storage medium of claim 1 wherein the first sequence comprises a scan line, each pixel of the first sequence having a position relative to a beginning of the scan line.

3. The data storage medium of claim 1 wherein:
a. the first sequence comprises a first scan line of pixels and a second scan line of pixels; and
b. the plurality comprises pixels of the first scan line and pixels of the second scan line.

4. The data storage medium of claim 1 wherein:
a. the first sequence comprises a multiplicity of scan lines; and
b. the plurality comprises pixels of sixteen scan lines.

5. The data storage medium of claim 1 wherein the plurality comprises sixteen pixels.

6. The data storage medium of claim 1 wherein the plurality comprises 256 pixels.

7. The data storage medium of claim 1 wherein the respective intensities of the plurality have a resolution of one bit.

8. The data storage medium of claim 1 wherein the step of revising further comprises:

determining an incremental intensity in response to the intensity of a pixel of the plurality; and adding the incremental intensity to the intensity of the pixel being revised.

9. The data storage medium of claim 8 wherein the incremental intensity is determined in response to a sum of the respective intensities of the plurality.

10. The data storage medium of claim 8 wherein the step of determining an incremental intensity further comprises:

forming an address in response to the intensity of a pixel of the plurality; and identifying the incremental intensity in response to the address.

11. The data storage medium of claim 10 wherein the address identifies an element of an array.

12. The data storage medium of claim 1 wherein the step of providing the third sequence further comprises:

forming an address in response to the intensity of the pixel and the intensity of the adjacent pixel; and identifying the member in response to the address.

13. The data storage medium of claim 12 wherein the address identifies an element of an array.

14. The data storage medium of claim 1 wherein the step of providing the third sequence further comprises:

forming an address in response to the respective intensities of a first multiplicity of adjacent pixel intensities, the first multiplicity comprising the respective intensities of the pixel and of the adjacent pixel; and identifying a second multiplicity of members in response to the address, the second multiplicity being provided as part of the third sequence.

15. The data storage medium of claim 14 wherein the address identifies an element of an array.

16. The data storage medium of claim 1 wherein:
a. the method further comprises providing a fifth sequence, each member of the fifth sequence identifying a respective position of a second pixel in the first sequence and a second adjacent pixel of different respective intensities, wherein providing comprises a third instruction that accounts for multiple pixels of the first sequence; and
b. the step of providing a fourth sequence further comprises performing the data compression method on the third sequence with the fifth sequence.

17. The data storage medium of claim 16 wherein:
a. the first sequence comprises a first scan line and a second scan line;
b. the first scan line comprises the pixel and the adjacent pixel for providing the third sequence; and
c. the second scan line comprises the second pixel and the second adjacent pixel for providing the fifth sequence.

18. The data storage medium of claim 1 wherein:
a. the fourth sequence has a first size; and
b. the step of providing the fourth sequence further comprises:

retaining the fourth sequence in a buffer, the buffer having a second size increased by the first size; and providing the buffer for storage in response to comparing the second size to a limit.

19. The data storage medium of claim 1 wherein each member of the third sequence identifies a position by run length.

20. A data storage medium comprising:

a. a data storage medium; and b. indicia recorded on the medium, the indicia comprising instructions for a processor to perform a method for processing pixels, each pixel having a one-bit intensity and a position within a scan line, the one-bit intensity being in a first state for marking and in a second state for spacing, the method comprising:

receiving a first, a second, a third, and a fourth pixel, the first and the second pixels being adjacent in a first scan line, the third and fourth input pixels being adjacent in a second scan line, the first and third pixels being adjacent, and the second and fourth pixels being adjacent;

determining a first output one-bit pixel intensity in the second state only when a first quantity of pixel intensities among the first, second, third, and fourth pixels in the second state is a majority and otherwise only when the first quantity in the first state is 2 and the pixels having respective intensities in the first state are diagonally opposed;

receiving a fifth, a sixth, a seventh, and an eighth pixel, the fifth and the sixth pixels being adjacent in the first scan line, the seventh and the eighth pixels being adjacent in the second scan line, the fifth and the seventh pixels being adjacent, and the sixth and the eighth pixels being adjacent;

determining a second output one-bit pixel intensity in the second state only when a second quantity of pixel intensities among the fifth, sixth, seventh, and eighth pixels in the second state is a majority and otherwise only when the second quantity in the first state is 2 and the pixels having respective intensities in the first state are diagonally opposed;

establishing a respective scan line position for the first output pixel and for the second output pixel, the respective scan line positions being adjacent;

appending a member to a first sequence, the member identifying the respective scan line positions when the first output pixel intensity and the second output pixel intensity differ; and providing a second sequence for storing, the second sequence resulting from performing a data compression method on the first sequence.

21. The data storage medium of claim 20 wherein the steps of determining the respective first and second output pixel intensities further comprise:

forming an address in response to the respective pixel intensities of the first, the second, the third, the fourth, the fifth, the sixth, the seventh, and the eighth pixels; and identifying the respective first and second output pixel intensities in response to the address.

22. The data storage medium of claim 20 wherein each member of the first sequence identifies a position by run length.

23. A method for processing pixels for displaying and storing, each pixel having a position within a sequence and having an intensity, the intensity having a resolution, the method comprising:

receiving a first sequence of pixels;

revising a second sequence of pixels to be provided for displaying, the intensity of a pixel of the second sequence being revised in response to respective intensities of a plurality of pixels of the first sequence, wherein revising comprises a first instruction that accounts for multiple pixels of the plurality;

providing a third sequence, each member of the third sequence identifying a respective position of a pixel in the first sequence and the adjacent pixel of different respective intensities, wherein providing comprises a second instruction that accounts a multiple pixels of the first sequence; and providing a fourth sequence for storing, the fourth sequence resulting from performing a data compression method on the third sequence.

24. The method of claim 23 wherein the first sequence comprises a scan line, each pixel of the first sequence having a position relative to a beginning of the scan line.

25. The method of claim 23 wherein:

a. the first sequence comprises a first scan line of pixels and a second scan line of pixels; and b. the plurality comprises pixels of the first scan line and pixels of the second scan line.

26. The method of claim 23 wherein:

a. first sequence comprises a multiplicity of scan lines; and b. the plurality comprises pixels of sixteen scan lines.

27. The method of claim 23 wherein the plurality comprises sixteen pixels.

28. The method of claim 23 wherein the plurality comprises 256 pixels.

29. The mehthod of claim 23 wherein the respective intensities of the plurality have a resolution of one bit.

30. The method of claim 23 wherein the step of revising further comprises:

determining an incremental intensity in response to the intensity of a pixel of the plurality; and adding the incremental intensity to the intensity of the pixel being revised.

31. The method of claim 30 wherein the incremental intensity is determined in response to a sum of the respective intensities of the plurality.

32. The method of claim 30 wherein the step of determining an incremental intensity further comprises:

forming an address in response to the intensity of a pixel of the plurality; and identifying the incremental intensity in response to the address.

33. The method of claim 32 wherein the address identifies an element of an array.

34. The method of claim 23 wherein the step of providing the third sequence further comprises:

forming an address in response to the intensity of the pixel and the intensity of the adjacent pixel; and identifying the member in response to the address.

35. The method of claim 34 wherein the address identifies an element of an array.

36. The method of claim 23 wherein the step of providing the third sequence further comprises:

forming an address in response to the respective intensities of a first multiplicity of adjacent pixel intensities, the first multiplicity comprising the respective intensities of the pixel and of the adjacent pixel; and identifying a second multiplicity of members in response to the address, the second multiplicity being provided as part of the third sequence.

37. The method of claim 36 wherein the address identifies an element of an array.

38. The method of claim 23 further comprising:

providing a fifth sequence, each member of the fifth sequence identifying a respective position of a second pixel in the first sequence and the second adjacent pixel of different respecitve intensities, wherein providing comprises a third instruction that accounts for multiple pixels for the first sequence;

wherein the step of providing a fourth sequence further comprises performing the data compression method on the third sequence with a fifth sequence.

39. The method of claim 38 wherein:

a. the first sequence comprises a first scan line and a second scan line;

b. the first scan line comprises the pixel and the adjacent pixel for providing the third sequence; and c. The second scan line comprises the second pixel and the second adjacent pixel for providing the fifth sequence.

40. The method of claim 23 wherein:

a. the fourth sequence has a first size; and b. the step of providing the fourth sequence further comprises:

retaining the fourth sequence in a buffer, the buffer having a second size increased by the first size; and providing the buffer for storage in response to comparing the second size to a limit.

41. The method of claim 23 wherein each member of the third sequence identifies a position by run lenghth.

* * * * *